United States Patent
Chang et al.

(10) Patent No.: US 6,577,513 B1
(45) Date of Patent: Jun. 10, 2003

(54) LIGHTING EQUIPMENT BUILT-IN ON-LINE UNINTERRUPTIBLE POWER SYSTEM CAPABLE OF OUTPUTTING AC SINUSOIDAL POWER FROM A SINGLE DC SOURCE

(75) Inventors: Herlin Chang, Sheng Keng Shiang (TW); Min-Huang Huang, Taoyuan Hsien (TW)

(73) Assignee: DigiPower Manufacturing Inc., Taipei (TW)

( * ) Notice: Subject to any disclaimer, the term of this patent is extended or adjusted under 35 U.S.C. 154(b) by 0 days.

(21) Appl. No.: 10/066,771

(22) Filed: Feb. 6, 2002

(51) Int. Cl.[7] .............................. H02M 5/40; H02J 7/00
(52) U.S. Cl. ........................ 363/37; 307/64; 320/128
(58) Field of Search ...................... 363/34, 37; 307/64, 307/65, 66; 320/128

(56) References Cited

U.S. PATENT DOCUMENTS

| | | | | |
|---|---|---|---|---|
| 4,728,808 A | * | 3/1988 | Bet-Esh et al. ............... | 307/66 |
| 5,241,217 A | * | 8/1993 | Severinsky ................... | 307/64 |
| 5,465,011 A | * | 11/1995 | Miller et al. .................. | 307/64 |
| 5,969,962 A | * | 10/1999 | Gabor .......................... | 363/89 |
| 5,994,794 A | * | 11/1999 | Wehrlen ....................... | 307/66 |
| 6,121,695 A | * | 9/2000 | Loh ............................. | 307/64 |
| 6,122,181 A | * | 9/2000 | Oughton, Jr. ................ | 363/37 |
| 6,157,168 A | * | 12/2000 | Malik .......................... | 320/128 |
| 6,169,669 B1 | * | 1/2001 | Choudhury ................... | 363/37 |

* cited by examiner

Primary Examiner—Adolf Deneke Berhane
(74) Attorney, Agent, or Firm—Bacon & Thomas, PLLC

(57) ABSTRACT

Disclosed is a lighting equipment built-in on-line uninterruptible power system (UPS) Capable of supplying AC sinusoidal power from a single DC source by boosting up the DC voltage of its battery unit and inverting it to an AC sinusoidal output via a DC to AC inverter circuit according to pulse width modulation (PWM) signals successively delivered by a controller circuit during the utility power failure, and at the same time, starts the built-in lighting equipment to illuminate the surroundings. The AC output power is intensified and stabilized through series and parallel connections of the inner circuit components of the UPS.

2 Claims, 3 Drawing Sheets

LIGHTING EQUIPMENT BUILT-IN ON-LINE UNINTERRUPTIBLE POWER SYSTEM CAPABLE OF OUTPUTTING AC SINUSOIDAL POWER FROM A SINGLE DC SOURCE

BACKGROUND OF THE INVENTION

1. Field of the Invention

The present invention relates to a lighting equipment buil-in on-line uninterruptible power system capable of outputting AC sinusoidal power from a single DC source, in particular, an interruptible power system (UPS) which can output AC sinusoidal power from its single DC power source by boosting up the DC voltage of its battery unit and inverting it to an AC sinusoidal power output via a DC to AC inverter circuit when the utility power breaks down, and can, at the same time, illuminate the surroundings with its built-in lighting equipment. Also the AC output power is intensified through series and parallel connection of the inner circuit components.

2. Description of the Prior Art

In case abnormal conditions such as power outage, undervoltage, overvoltage, or abnormal frequency happen to the utility supply power, the customers will be subjected to inconveniency, even damage to their electric equipment owing to discontinuity of the power supply.

The development of the UPS is a rescue to the aforesaid situation. The battery unit in a UPS is maintained in floating charge state from the utility power supply when its source is normally operating. But as soon as the utility source has become unable to supply power to the loads normally, the UPS at the load side immediately takes over the responsibility for supplying the power to the connected loads in place of the utility source by discharging the stored electricity in the battery unit to the connected loads.

In a conventional UPS, it is required a plurality of electrical source for converting its stored power to sinusoidal AC output to supply the connected loads in the emergency through complicated functions of the inner controller circuit thereof, besides, the conventional UPS is not provided with a built-in lighting equipment for providing illumination in an emergency case, instead of it, a necessary environmental lighting in the emergency has to depend on the existing lighting loads which get the power supply from the UPS.

In view of the forgoing situation the inventor of the present invention herein conducted intensive research based on many years of manufacturing of related products, with continuous experimentation and improvement culminating in the development of the present invention which is to be elucidated hereinafter.

SUMMARY OF THE INVENTION

It is an object of the present invention to provide an on-line UPS with simplified inner controller circuits and capable of outputting AC sinusoidal power from a single DC source.

It is another object of the present invention to provide an on-line UPS which is capable of providing environmental illumination in the emergency with a built-in lighting equipment.

It is one more object of the present invention to provide an on-line UPS which is capable of intensifying its output power by ingeniously connecting circuit components in series and parallel.

To achieve these and other objects described above, the UPS of the present invention is composed of a power source detecting circuit, an AC to DC converter circuit, a controller circuit, a battery unit, a system power circuit, a charging circuit, a DC to DC booster circuit, a DC to AC inverter circuit, and a built-in lighting equipment. The UPS of the present invention is an on-line system whose output of the single DC source is inverted to an AC sinusoidal output by the DC to AC inverter circuit according to successive PWM signals delivered from the controller circuit, and at the same time, the environmental illumination is provided by the built-in lighting equipment of the UPS of the present invention.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
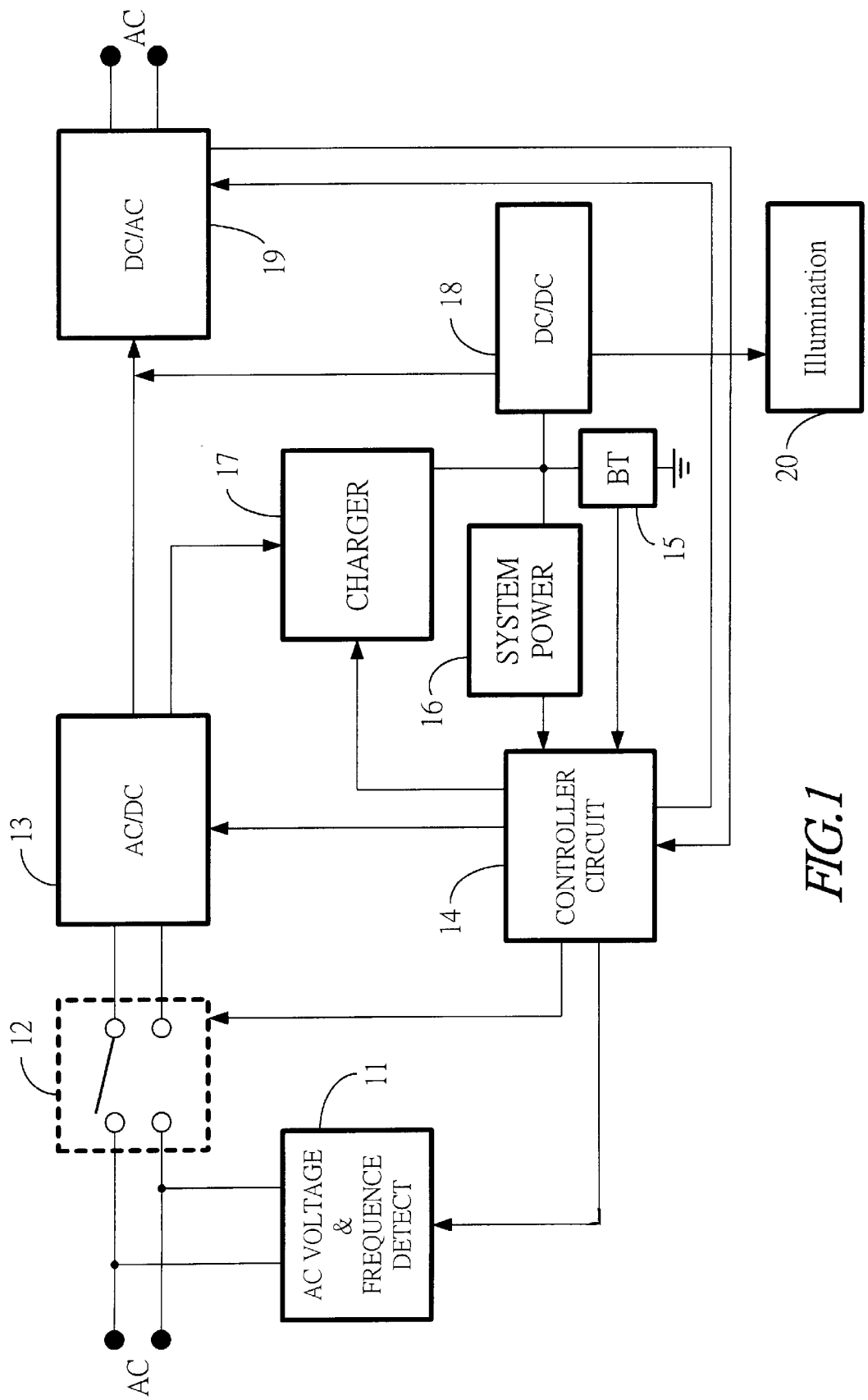
FIG. 1 is a block diagram showing the scheme of the UPS of the present invention.
Figure 2:
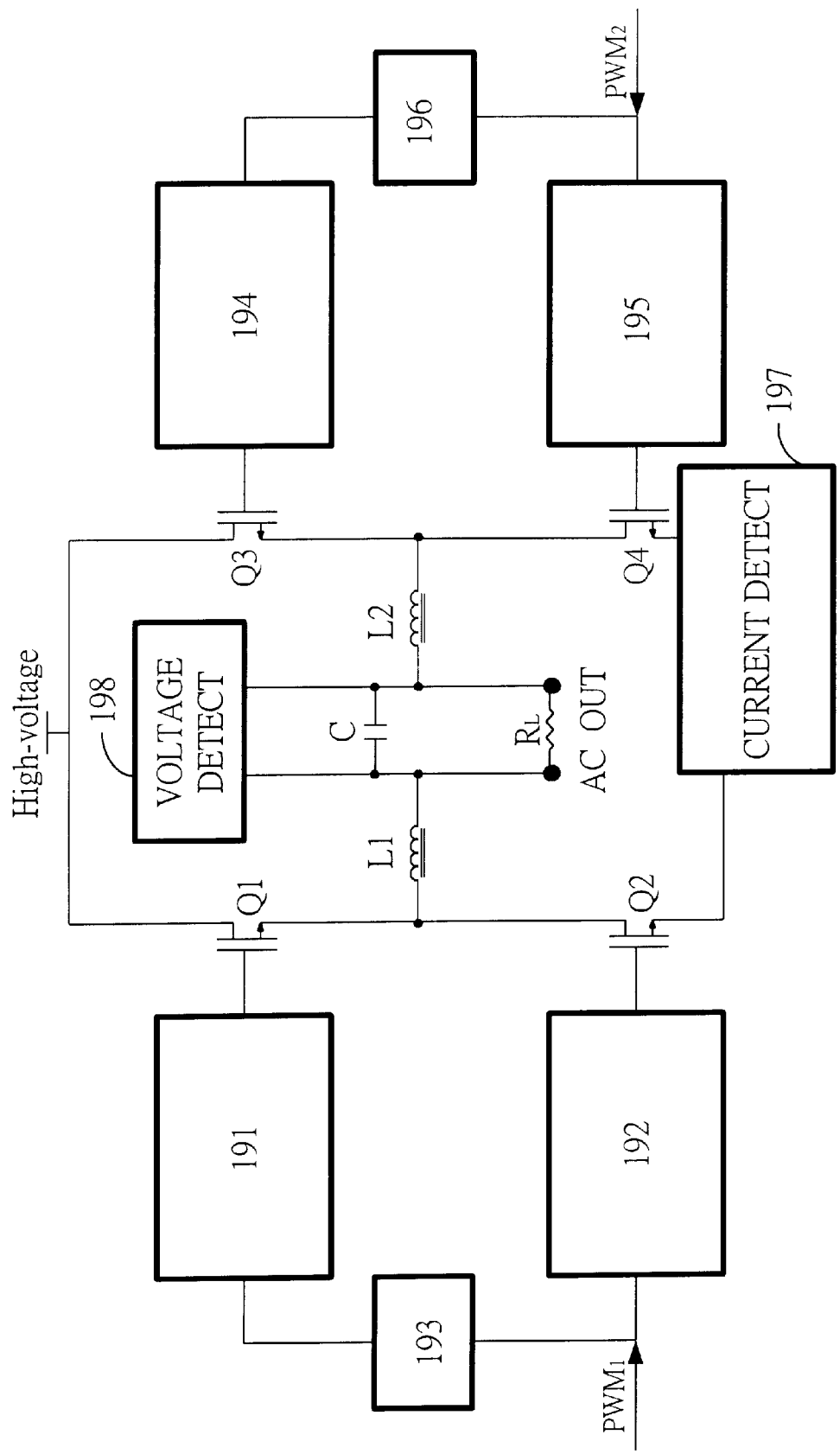
FIG. 2 is a layout diagram of the DC to AC inverter circuit of the present invention.
Figure 3:
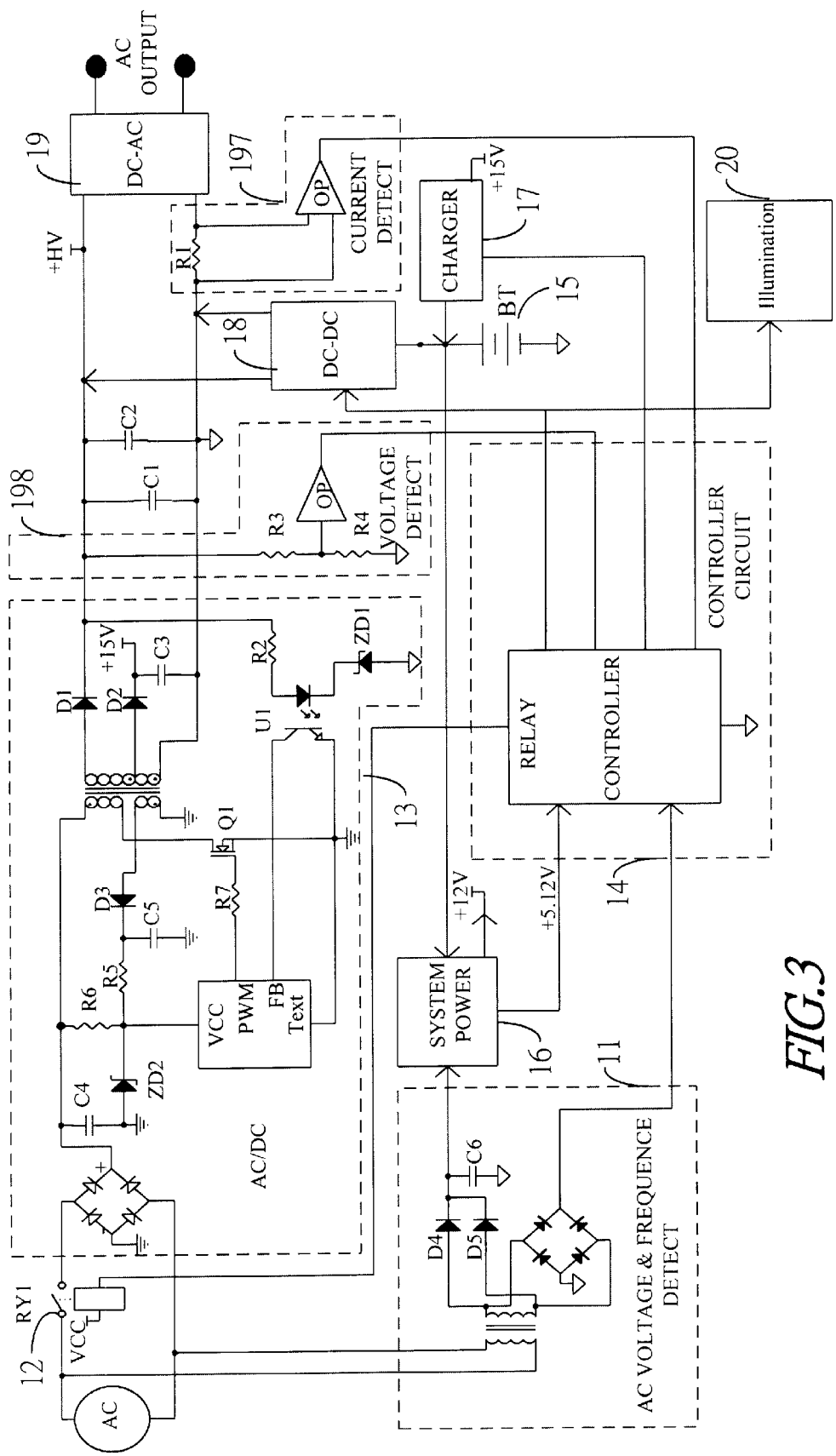
FIG. 3 is the circuit diagram of the UPS of the present invention.

Referring to FIG. 1 through FIG. 3, the UPS of the present invention is composed of a power source detecting circuit 11, an electromagnetic switch 12, an AC to DC converter circuit 13, a controller circuit 14, a batter unit 15, a system power circuit 16, a charging circuit 17, a DC to DC booster circuit 18, a DC to AC inverter circuit 19, and a built-in lighting equipment 20. The UPS of the present invention is an on-line system whose single DC source is able to produce DC signals and PWM signals thereby outputting AC sinusoidal power via treatment performed by the DC to AC inverter circuit in the emergency situation of the utility source, and at the same time, the environmental illumination is provided by the built-in lighting equipment 20.

When there is a normal utility AC input, the power source detecting circuit 11 sends a signal indicating the controller circuit 14 to actuate the electromagnetic switch 12 and the AC to DC converter circuit 13 thereby supplying a DC current to both DC to AC inverter circuit 19 and the battery unit 15. Here, the high DC voltage power outputted by the AC to DC converter circuit 13, that is, a single source Dc power, is inverted to an Ac output via the DC to AC inverter circuit 19 according to pulse width modulation (PWM) signals delivered by the controller circuit 14. As soon as the battery unit 15 has been fully charged, a signal is sent to notify the controller circuit 14 that the charging circuit 17 should stop charging so as to protect the battery unit 15 from being overcharged. In case the utility AC power source becomes abnormal and break down, the situation is detected by the power source detecting circuit 11 which indicates the controller circuit 14 to actuate the DC to DC booster circuit 18, the DC to DC booster circuit 18 in turn boosts up the DC output voltage of the battery unit 15 and sends it to the DC to AC inverter circuit 19 so as to supply an emergency AC power to the connected loads from the UPS of the present invention, and at the same time, the built-in lighting equipment 20 is started to illuminate the surroundings. Meanwhile, the output of the DC to DC booster circuit 18 is a single source high DC voltage which is inverted to an AC output voltage via the Dc to AC inverter circuit 19 according to the aforesaid PWM signals successively delivered by the controller circuit 14.

Referring to FIGS. 2 and 3, the DC to AC inverter circuit 19 includes a load current detecting circuit 197, an output voltage detecting circuit 198, a first high voltage side driving circuit 191, a first low voltage side driving circuit 192, a first inverter 193, a second high voltage side driving circuit 194, a second low voltage side driving circuit 195, a second inverter 196, transistors Q1, Q2, Q3, Q4, inductors L1, L2, and a capacitor C As soon as the single source high DC voltage is sent to the DC to AC inverter circuit 19, it is inverted to an AC output voltage according to the PWM signals delivered from the controller circuit 14.

When the PWM signal is PWM1, the transistor Q3 is OFF, by a push-pull action between transistors Q1 and Q2 to actuate inductor L1 and capacitor C for storing the energy such that a positive half cycle sinusoidal voltage appears at the output terminals, and there is a current flowing from inductor L2 to the load current detecting circuit 197 via transistor Q4. When the PWM signal is PWM2, transistor Q1 is OFF, by a push-pull action between transistor Q3 and Q4 to actuate inductor L2 and capacitor C for storing energy, at this moment a negative half cycle sinusoidal voltage appears at the output terminals and there is a current flowing from inductor L1 to the load current detecting circuit 197 via transistor Q4.

Meanwhile, the load current detecting circuit 197 is for detecting the output current of the DC to AC inverter circuit 19, and sending the resultant data to the controller circuit 14, on the other hand, the output voltage detecting circuit 198 is for detecting the voltage at the output terminals, and sending the resultant data to the controller circuit 14. The controller circuit 14 controls the PWM signals based on aforesaid resultant data obtained from the two detecting circuits 197 and 198 so as to regulate the output voltage.

It emerges from the description of the above embodiment that the invention has several noteworthy advantages that none of the existing conventional UPS has, in particular:

1. The circuits involved in the present invention is simplest compared to any other existing UPS, the sinusoidal AC output can be obtained by only a single DC source.
2. A built-in lighting equipment can serve to illuminate at once the surroundings in an emergency case of the utility power outage.
3. The output power of the present invention is intensified and stabilized by ingeniously laying out seriously and parallelly the circuit components in the ups.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A lighting equipment built-in on-line UPS capable of outputting AC sinusoidal power from a single DC source comprising:

a system power circuit for supplying necessary power for inner components of the UPS;

a power source detecting circuit for detecting the utility AC input;

an electromagnetic switch;

a DC to AC inverter circuit for inverting DC to AC output, and detecting the values of AC output voltage and current;

an AC to DC converter circuit for converting incoming AC voltage to a high DC voltage and supplying it to said Dc to AC inverter circuit;

a battery unit;

a charging circuit for charging said battery unit;

a controller circuit for sending pulse width modulation (PWM) signals to said DC to AC inverter circuit and receiving resultant data about output voltage and current of said DC to AC inverter so as to control said AC to DC converter, said charging circuit, and said electromagnetic switch;

a DC to DC booster circuit for receiving the signal from said controller circuit and boosting up the low battery voltage to a higher DC voltage and then sending it to said DC to AC inverter circuit;

a built-in lighting equipment for illuminating the surroundings with the power supplied by said DC to DC booster circuit;

With this scheme, when there is a normal utility AC input, said power source detecting circuit sends a signal indicating said controller circuit to actuate said electromagnetic switch and said AC to DC converter circuit thereby supplying a DC current to both DC to AC inverter circuit and battery unit for charging, as soon as said battery unit has been fully charged, a signal is sent to notify said controller circuit that said charging circuit should stop charging so as to protect said battery unit from overcharging, in case the utility AC power source becomes abnormal and breaks down, the situation is detected by said power source detecting circuit which indicates said controller circuit to actuate said DC to DC booster circuit, said DC to DC booster circuit in turn boosts up the DC output voltage of said battery unit and sends it to said DC to AC inverter circuit so as to supply an emergency AC power to the connected loads, and at the same time, said built-in lighting equipment is started to illuminate the surroundings.

2. The on-line UPS of claim 1, wherein the output of said DC to DC booster circuit is inverted to an AC output voltage via said DC to AC inverter circuit according to PWM signals successively delivered by said controller circuit.

* * * * *